United States Patent [19]

Patenaude

[11] Patent Number: 4,744,535
[45] Date of Patent: May 17, 1988

[54] PIPE SEAT

[76] Inventor: George A. Patenaude, P.O. Box 408, Mechanicville, N.Y. 12118

[21] Appl. No.: 29,542

[22] Filed: Mar. 24, 1987

[51] Int. Cl.⁴ .............................................. F16L 3/00
[52] U.S. Cl. .................................... 248/74.1; 248/62
[58] Field of Search ................... 248/74.1, 62, 65, 58, 248/55, 228, 916, 359.1, DIG. 1

[56] References Cited

U.S. PATENT DOCUMENTS

| | | | |
|---|---|---|---|
| 2,466,247 | 4/1949 | Land | 248/62 |
| 3,122,346 | 2/1964 | Seiler | 248/62 |
| 3,185,758 | 5/1965 | Litz | 248/62 |
| 3,203,653 | 8/1965 | Hall | 248/62 |
| 3,530,899 | 9/1970 | Breeding | 248/62 |
| 3,933,377 | 1/1976 | Arrowood | 285/61 |
| 4,113,286 | 9/1978 | Kennedy, Jr. | 285/61 |
| 4,121,796 | 10/1978 | Forbes | 248/62 |
| 4,267,994 | 5/1981 | Linch et al. | 248/74.1 X |

Primary Examiner—Ramon O. Ramirez
Attorney, Agent, or Firm—Heslin & Rothenberg, P.C.

[57] ABSTRACT

A pipe seat positionable between a portion of pipe and a surrounding pipe support structure is disclosed. When properly positioned, the seat is constructed to cradle the pipe, isolate the pipe from the pipe support structure, and inhibit the collection of corrosive material on the pipe in the vicinity of the pipe support. Molded of an engineered resin, the seat consists of a generally arc-shaped member having a plurality of channels in both its top surface and bottom surface which are sufficient to facilitate air flow about the pipe and its surrounding support structure. The seat can be constructed of a plurality of colors to be useful in warning of an internal pipe hazard.

16 Claims, 2 Drawing Sheets

PIPE SEAT

BACKGROUND OF THE INVENTION

1. Technical Field

This invention relates in general to piping, and more particularly, to a seat positionable between a portion of pipe and a surrounding pipe support structure such as to cradle the pipe, isolate the pipe from the pipe support, and inhibit the collection of corrosive material on the pipe in the vicinity of the pipe support.

2. Description of the Prior Art

Pipes are made of a great variety of materials, including plastic, copper, iron, steel, and other metals. Perhaps the most extensively used pipes in industrial and commercial buildings, however, are black iron or carbon/steel pipes because of their great strength and relatively inexpensive cost. Two types of pipe support structures are in general use today for these pipes.

One type of support structure consists of a plurality of suspended hangers, each of which loosely encompasses and supports the pipe at an appropriate elevation. Supporting hangers, comprising in part strips of a few inches width, are spaced every 8 to 10 feet along the pipe, depending upon the pipe weight to be supported. The other type of support in common use consists of a bridge or frame structure, which is also constructed to maintain the pipe at a suitable elevation by providing support to the pipe at predetermined spaced intervals. Bridge or frame support structures are typically metallic in nature, frequently being constructed of steel I-beams. Inverted U-shaped bolts are affixed to each supporting, horizontal leg of the bridge or frame structure to surround the pipe and prevent appreciable lateral pipe movement. Both types of support, i.e., hangers and bridge structures, may allow pipes to slide freely axially and both may accomodate a degree of radial expansion and contraction. Axial and radial degrees of freedom are often necessary since pipes commonly expand and contract with changes in ambient conditions, such as temperature and humidity.

A principal problem with both types of pipe supports, which does not appear to have been previously addressed, involves corrosion of the pipe and/or support. Corrosion is defined as a naturally occurring physical and chemical deterioration of a material, especially metal, due to reaction with its environment. The most familiar form of corrosion is rusting, which results from oxidation of the metal. In most industrial and many commercial settings, e.g., chemical, paper and petroleum plants and large commercial buildings, there are airborne materials which either themselves corrode carbon/steel pipe (e.g., any of a wide range of acidic compounds) or facilitate, i.e., enhance, the corrosion of such pipes, through oxidation (e.g., water) (hereinafter collectively referred to as "corrosive material").

Corrosion of industrial and commercial pipes is frequently greatest at those areas contacting the support structure. This is due in part to the collection and rentention of corrosive material between a pipe and its support structure. For example, if a pipe is exposed to the elements, water from rain or snow collects on the pipe and its support, and between the pipe and its support structure. Additionally, even if a pipe is protected from the elements, ambient conditions may cause beads of water or "sweat" to form on and between the pipe and its support structure. Normally, water simply evaporates from these surfaces with time, however, because of a lack of air flow between the pipe and its support structure, moisture remains there for longer time intervals which in turn results in a higher rate of pipe and/or support structure corrosion.

Corrosion is also enhanced with the erosion of the protective covering on the pipe and/or its support structure from the abrasive contact action between the pipe and the support as the pipe undergoes normal expansion and contraction. Additionally, it is well established that corrosion of metal is typically faster along a surface where two metals contact, such as where the carbon/steel pipes contact their metallic support structures.

Over time, sufficient corrosion damage can occur in the pipe and/or its support structure, from a combination of one or more of the above factors, as to require replacement of the pipe or support structure. If unanticipated, replacement of the pipe or its support structure can be costly, disruptive and a time consuming project. Should a corroded pipe or support structure not be replaced when necessary, a dangerous situation can exist which could ultimately result in a break or explosion, causing serious personal injury and/or costly environmental damage.

Each year industry expends substantial amounts of money to maintain and protect pipes and associated pipe supports against corrosion with the application of surface coatings such as paint. Regular painting of pipes and their support structures, however, often only serves to disguise a dangerous situation by concealing the extent of corrosion, particularly at those areas where the pipe contacts its support structure.

Existing modifications to the two types of support structures described do not address the corrosion problem, and in fact only serve to worsen it. For example, the placement of a rubber or foam pad between a pipe and its support, or the provision of galvanized half sheets of metal to cradle the pipe, only serve to increase the collection and retention of corrosive material between the pipe and its support structure.

Therefore, there presenty exists a genuine need for a seat positionable between a portion of pipe and its surrounding support structure which isolates the pipe from the support and inhibits the collection of corrosive material between the pipe and its support.

SUMMARY OF THE INVENTION

Accordingly, a principle object of the present invention is to provide a pipe seat positionable between a portion of pipe and a surrounding pipe support, which inhibits the collection and retention of corrosive material between the pipe and the support.

Another object of the present invention is to provide a pipe seat which isolates a pipe from direct contact with its support structure.

Yet another object of the present invention is to provide a pipe seat which facilitates the evaporation of moisture between and around the pipe and its support.

Still another object of the present invention is provide a pipe seat which is capable of being used to identify a hazardous condition within the pipe.

A further object of the present invention is to reduce or eliminate maintenance and replacement costs associated with pipes and their support structures.

A yet further object of the present invention is to provide a pipe seat readily adaptable for use with existing pipes and pipe supports, which is inexpensive to manufacture and easy to install.

A still further object of the present invention is to provide a pipe seat which can be effectively used in either an indoor or outdoor environment.

The present invention accomplishes these objects by providing a seat positionable between a portion of pipe and a surrounding pipe support such as to cradle the pipe and isolate the pipe from the pipe support. The seat consists of a preformed rigid body member having a substantially arc-shape. The body member has a top surface which is formed to engagably cradle the pipe and a bottom surface which is formed to engagably conform to the contour of a portion of the pipe support structure when the seat is positioned between the pipe and the support. Further, the top surface of the arc-shaped body member has at least one channel therein sufficient to inhibit the collection and retention of corrosive material on the pipe in the vicinity of the pipe support by allowing air flow about the pipe at the pipe support.

BRIEF DESCRIPTION OF THE DRAWINGS

While the specification concludes with claims particularly pointing out and distinctinly claiming the present invention, the objects, features, and advantages of the present invention can be more readily ascertained from the following detailed description of one preferred embodiment when read in conjunction with the accompanying drawings in which:

DETAILED DESCRIPTION OF THE INVENTION

Figure 1:
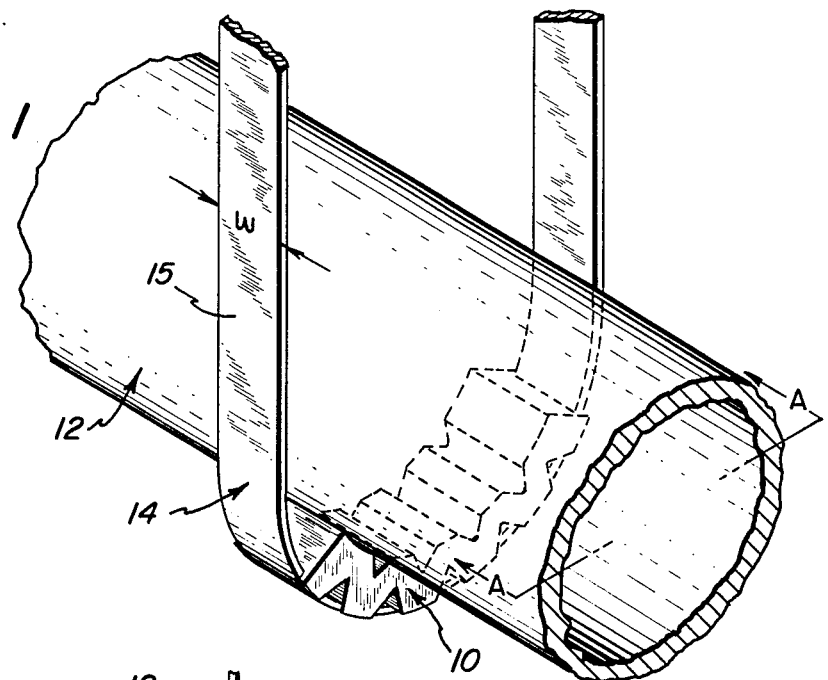
FIG. 1 is a prespective view of a pipe seat of the present invention positioned between a portion of pipe and a surrounding pipe support.
Figure 2:
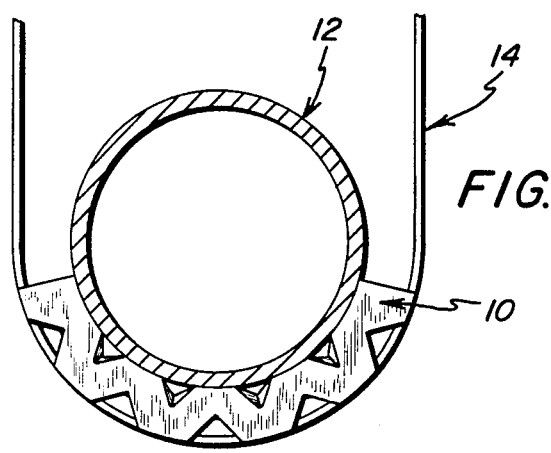
FIG. 2 is an end view of the assembly shown in FIG. 1 taken along lines A—A.
Figure 3:
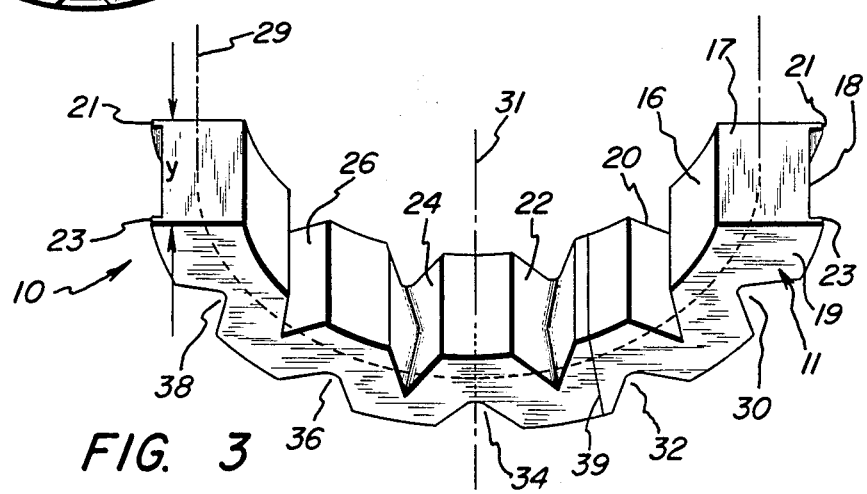
FIG. 3 is an enlarged perspective view of the pipe seat shown in FIG. 1.

A first embodiment of the pipe seat of the present invention is illustrated in FIGS. 1–3. The pipe seat, generally denoted 10, is shown positioned between a portion of pipe 12 and a surrounding hanger support structure 14 in FIGS. 1 and 2. Pipe 12 could consist of any commonly used industrial, commercial or residential pipe such as cast iron, plastic, or copper pipe. However, greatest benefits are obtained from the present invention when it is used in association with relatively readily corrosive metallic pipe such as the carbon/steel pipe used extensively today in many industrial and commercial buildings. Hanger support 14, suspended from an overhead structure (not shown), typically includes a metallic strap 15 of several inches width "w" and sufficient length to loop around pipe 12 as shown.

Seat 10 is constructed to cradle pipe 12 and isolate the pipe from support 14 when properly positioned between the pipe and the support. This isolation of pipe 12 from support 14 alleviates several problems inherent in existing pipe support structures. For example, as mentioned above, where pipe 12 and support 14 contact there is often an abrasive action due to the normal expansion and contraction of the pipe with concomitant erosion of any protective coating on the pipe and/or the support. Obviously, to the extent that the protective coating on either pipe 12 or support 14 is removed, the rate at which pipe 12 or support 14 corrodes is greatly increased. Also as mentioned above, it is known that the corrosion rate among metals is typically higher where two metals contact. Seat 10, which is preferably manufactured of a nonmetal (as discussed below), completely eliminates this increased rate of corrosion by isolating the two metals, i.e., the pipe and the support.

Seat 10 also inhibits the collection and retention of corrosive material between pipe 12 and support 14 by facilitating air flow between and around pipe 12 and support 14. Referring to FIG. 3, this is accomplished by providing a plurality of sufficiently sized transverse channels or grooves 20, 22, 24 and 26 in a first or top surface 16 (i.e., that surface designed to cradle pipe 12) of the main, pre-formed rigid body member 11 (discussed below) of seat 10 and a plurality of sufficiently sized transverse channels or grooves 30, 32, 34, 36 and 38 in a second or bottom surface 18 (i.e., that surface designed to engageably conform to a portion of support 14) of body member 11. As shown, seat 10 is properly positioned between pipe 12 and support 14 when it is located between the pipe and the principal load bearing portions of the support structure with top surface 16 cradling pipe 12 and bottom surface 18 engageably conforming to the load bearing portion of support 14. The size, quantity, and location of the top surface channels and the bottom surface channels may vary without departing from the scope of the present invention as defined by the appended claims. The channels need only be sufficient to accomplish the objective of allowing air flow between and about pipe 12 and support 14 when seat 10 is properly positioned therebetween.

Body member 11 is preferably manufactured of an engineered plastic or resin such as thermal plastic filled or unfilled, thermal sets, compounded resins or any combination thereof. The particular material selected or engineered in a known manner depends principally upon the strength requirements needed of body 11 to support pipe 12. In the embodiment shown, body member 11 has a generally arc-shape and is substantially symmetrical about a center axis 29 and a vertical middle line 31. In addition, the presence of top surface channels and bottom surface channels, which are each preferably rounded or U-shaped to eliminate points of weakness which would be inherent in sharp rectangular edges, result in body member 11 having a generally saw-tooth design. Body member 11 preferably has a width "y" slightly greater than the width "w" of hanger support 14 (see FIG. 1) for ease of positioning seat 10 between pipe 12 and support 14. Positioning lip means 21 and 23, extending from bottom surface 18 at or near each side 17 and 19, respectively, of body member 11, are preferably provided for facilitating proper positioning of seat 10 between pipe 12 and support 14 and maintaining seat 10 between pipe 12 and support 14 once properly positioned. Without positioning lip means 21 and 23, seat 10 would have a tendency to become dislodged from between pipe 12 and support 14 with normal expansion and contraction of pipe 12.

In the preferred embodiment, each top surface channel 20, 22, 24 and 26 is convex, i.e., slopes downwardly (when properly positioned) from center axis 29 to sides 17 and 19 of body member 11, to facilitate drainage of corrosive material, defined above, from the pipe and the channel. In addition, seat 10 is preferably manufactured of a plurality of colors which correspond with colors standardized by the U.S. Occupational Health and Safety Administration and the American National Standards Institute (ANSI) for identifying hazardous conditions, i.e., based upon the type of material and/or pressue within a pipe. For example, an orange or yellow color identifies an extrememly hazardous condition, such as would exist with pressurized natural gas, while a green color signifies a safe condition, such as water under a safe pressure. With the use of a colored seat, identification of a hazardous condition is not impaired by a subsequent painting over of warning stripes on pipe 12 or support 14 as is frequently the case today. Also, since seat 10 is relatively easy to install and remove, a seat of one color can be removed and replaced with a seat of another color should conditions change.

If desired, seat 10 can include a protective overlay to block color fading which would normally occur with exposure to ultraviolet light and can be embossed with lettering to specifically identify the material and/or pressure range of the material within pipe 12. Seat 10 is preferably manufactured with a fireproof or fire resistant additive such that in case of fire seat 10 will not burn against pipe 12. Lastly, if desired, seat 10 can include a thin metal strip 39 for static grounding of pipe 12 to support 14.

Figure 4:
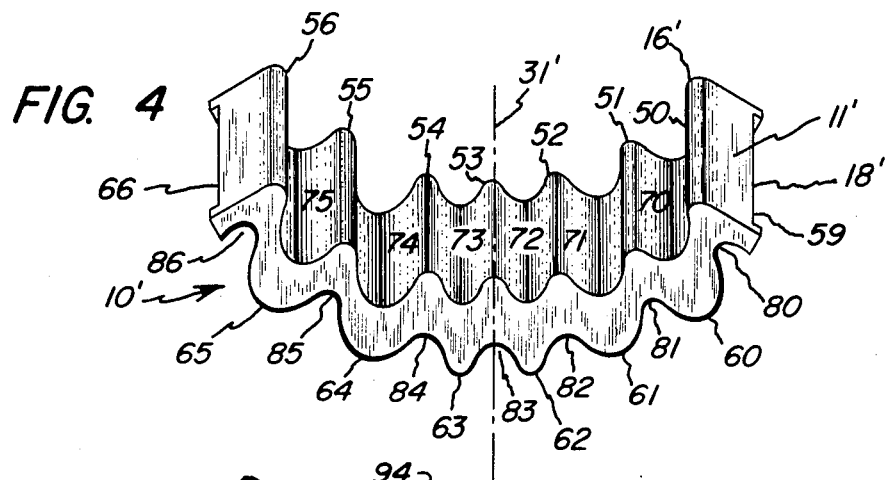
FIG. 4 is an enlarged perspective view of an alternate embodiment of a pipe seat of the present invention.

An alternate structural embodiment of the pipe seat of the present invention is shown perspectively in FIG. 4. As in the case with seat 10 discussed above in connection with FIGS. 1-3, this pipe seat embodiment is designed to be positioned between a pipe and a hanging support structure. Seat 10' includes pre-formed rigid body member 11' which has a top surface 16' designed to cradle a pipe (not shown) and a bottom surface 18' constructed to conform to a portion of a hanging support structure (not shown) when seat 10' is properly positioned (similarly as discussed above with respect to seat 10) between the pipe and the support. The surface area of body member 11' designed to contact the pipe or the support is greatly reduced in this embodiment from that illustrated in FIGS. 1-3. As shown, rounded top surface contact ridges 50, 51, 52, 53, 54, 55 and 56 and rounded bottom surface contact ridges 59, 60, 61, 62, 63, 64, 65 and 66 are provided. Top surface contact ridges and bottom surface contact ridges define wide channels 70, 71, 72, 73, 74 and 75, and 80, 81, 82, 83, 84, 85 and 86, respectively, which provide greater air flow about and between the pipe and support than seat 10 discussed above, which further limits the collection and retention of corrosive material on the pipe and the support. The width and/or depth of the channels in either top surface 16' or bottom surface 18' may vary as desired. In particular, channels 72 and 73 in top surface 16' and channels 82, 83 and 84 in bottom surface 18' are shown to have less depth than the other top and bottom surface channels in body member 11' such that greater mass is distributed about the vertical middle line 31' of seat 10'. With increased mass about its middle line, seat 10' has greater strength and rigidity at that portion bearing the greatest load (i.e., the pipe weight borne by seat 10' when properly positioned between the pipe and the principal load bearing portion of the support structure).

Figure 5:
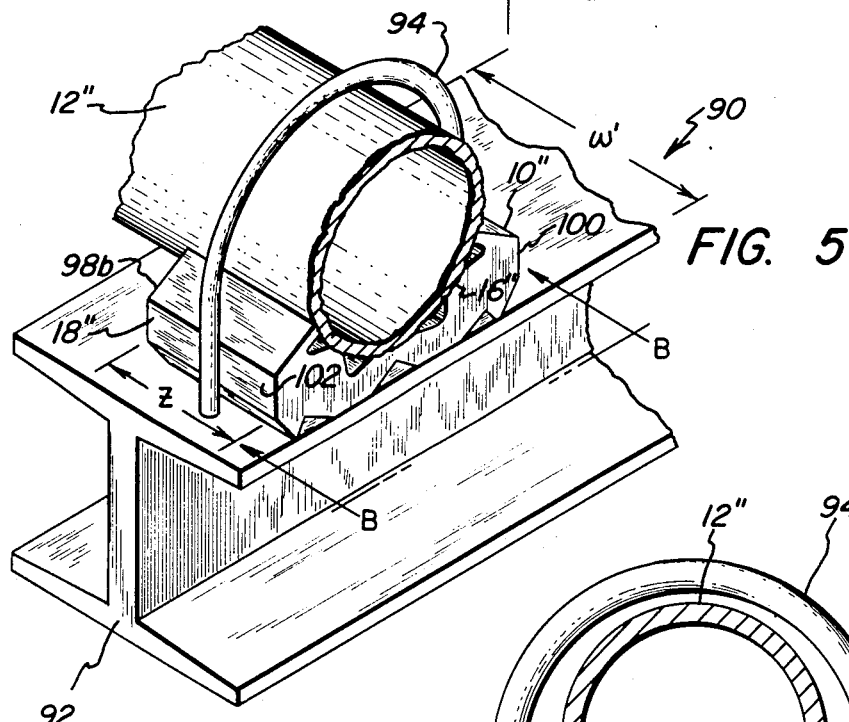
FIG. 5 is a perspective view of another alternate embodiment of the pipe seat of the present invention shown positioned between a portion of pipe and a surrounding bridge support structure.
Figure 6:
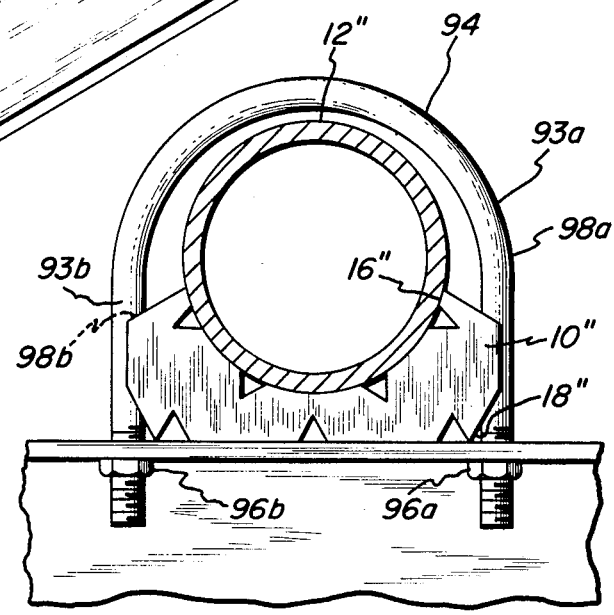
FIG. 6 is an end view of the assembly shown in FIG. 6 taken along lines B—B.

Another embodiment of the seat of the present invention will be described with reference to FIGS. 5 and 6. In this embodiment, a pipe seat 10'' is designed to be utilized between a portion of pipe 12'' and a bridge support structure, generally denoted 90. As described above in connection with seat 10, seat 10'' is molded of a rigid plastic material and includes a plurality of channels in both its top and bottom surfaces to facilitate air flow about the pipe and the support.

Bridge support structure 90 consists of a metal I-beam 92 to which an inverted U-bolt 94 is threadably secured with nuts 96a and 96b. In this embodiment, seat 10'' has a width "z" greater than the width "y" of seat 10 described above since I-beam 92 has a width "w'" several times greater than the width "w" of hanger support 14. With greater width "z" the load or weight of pipe 12'' is distributed over a wider support area, which lessens the chance that seat 10'' will fail under stress. Although still generally arc-shaped, the geometry of seat 10'' is different than that of seat 10, primarily due to structural differences in the support mechanisms, i.e., I-beam 92 and inverted U-bolt 94 combine to form a rectangular shaped support structure to which bottom surface 18'' of seat 10'' must conform, whereas support 14 is clearly semicircular in nature. Two longitudinal grooves 98a and 98b are formed in bottom surface 18'' of seat 10'' at opposite ends 100 and 102 of body member 11'' to engage and partially surround the vertically extending portions 93a and 93b of inverted U-bolt 94. By engaging U-bolt 94 within channels 98a and 98b, seat 10'' will remain fixed in the desired position between pipe 12 and bridge support structure 90 notwithstanding expansion and contraction of pipe 12.

In whatever embodiment, the pipe seat of the present invention is preferably capable of being retrofitted into existing installations or easily incorporated into new installation designs. Industrial and commercial pipes and their support structures typically exist in a number of standard sizes. For example, 1, 2, 3, 4, 6, 8, 10 and 12 inch diameter pipes are common. With the present invention, therefore, the only modification needed prior to installation of the pipe seat is that the support structure be oversized relative to the pipe diameter, i.e., a one inch diameter pipe may require a support hanger initially designed to accommodate a three or four inch diameter pipe before the seat can be installed. Note, however, that this only involves the substitution of one readily available support structure for another readily available support structure.

It will be observed from the above that this invention fully meets the objectives set forth. A pipe seat positionable between a portion of pipe and a surrounding pipe support which inhibits the collection and retention of corrosive material on the support and the pipe in the vicinity of the support is provided. In addition, the pipe seat isolates the pipe from the pipe support and facilitates the evaporation of moisture between and around the pipe and the support. Further, the color of the pipe seat can be selected to identify a hazardous condition within a pipe. Lastly, it will be noted that the pipe seat is readily adaptable for use with existing pipes and pipe support structures and can be used in connection with new installations or can be retrofitted on existing installations.

Although several embodiments have been illustrated in the accompanying drawings and described in the foregoing detailed description, it will be understood that the invention is not limited to the particular embodiments discussed but is capable of numerous rearrangements, modifications and substitutions without departing from the scope of the invention. The following claims are intended to encompass all such modifications.

I claim:

1. A seat capable of being positioned between a portion of pipe and surrounding pipe support such that the seat cradles the pipe and isolates the pipe from the pipe support, said seat comprising:

a performed rigid body member manufactured of an engineered resin and having a substantially arc-shape, said body member having a top surface and a bottom surface, said top surface being formed to engagably cradle said pipe and said bottom surface being formed to engagably conform to the contour of a portion of said pipe support when said seat is positioned between said pipe and said support, said top surface having at least one channel therein sufficient to allow air flow about said pipe and thereby inhibit the collection and retention of corrosive material on said pipe in the vicinity of said support.

2. The seat as recited in claim 1, wherein said bottom surface has at least one channel therein, said at least one bottom surface channel being sufficient to allow air flow about said pipe support and thereby inhibit the collection and retention of corrosive material on said support.

3. The seat as recited in claim 2, wherein said at least one body member top surface channel comprises a plurality of channels and wherein said at least one body member bottom surface channel comprises a plurality of channels.

4. The seat as recited in claim 4, wherein said plurality of channels in said top surface and said plurality of channels in said bottom surface are located transverse said body member.

5. The seat as recited in claim 1, wherein said body member includes means for assisting the proper positioning of the seat between said pipe and said support and for maintaining said seat between said pipe and said support once properly positioned.

6. The seat as recited in claim 5, wherein said proper body member position is between said pipe and the principal load bearing portion of said pipe support.

7. The seat as recited in claim 6, wherein said plurality of channels in said top surface slope downwardly from the center to the side edges of said body member to facilitate drainage of corrosive material from said top surface channels and said pipe when said seat is positioned between said pipe and said support.

8. The seat as recited in claim 7, wherein said engineered resin is manufactured in a plurality of predefined colors, said predefined colors corresponding to accepted industry hazardous condition identification colors.

9. The seat as recited in claim 8, wherein said pipe and said support are metallic and said body member includes means for statically grounding said pipe to said support.

10. The seat as recited in claim 6, wherein said support comprises a pipe hanger having a strap partially encircling said pipe and wherein said seat has a width slightly greater than the width of said strap and said seat positioning and maintaining means comprises lip means projecting from said bottom surface of said body member near each side of said member.

11. The seat as recited in claim 6, wherein said support comprises a pipe bridge and an inverted U-shaped bolt affixed thereto, and wherein said positioning and maintaining means comprises two longitudinal grooves in said bottom surface of said body member, one of said longitudinal grooves being located near each end of said member, said longitudinal grooves being formed to partially engagably receive the sides of said inverted U-shaped bolt to thereby fixedly position said seat on said bridge under said pipe within said bolt.

12. A seat positionable between a portion of pipe and a surrounding pipe support such that the seat cradles the pipe and isolates the pipe from the pipe support, said seat comprising:

a rigid body member manufactured of an engineered resin and having a substantially saw-toothed design and arc-shape, said body member having a first surface and a second surface, said first surface being formed to engagably cradle said pipe and said second surface being formed to engagably conform to the contour of a portion of said pipe support, said saw-tooth body member design allowing air flow about said pipe and said support when said seat is properly positioned therebetween such that the collection and retention of corrosive material on said pipe and said support is inhibited.

13. The seat as recited in claim 12, wherein said proper body member position is between said pipe and the principal load bearing portion of said pipe support.

14. The seat as recited in claim 13, wherein said saw-tooth body member design is irregular such that said seat is structurally stronger at its principal load bearing area defined when said seat is properly positioned between said pipe and said support.

15. The seat as recited in claim 14, wherein said saw-tooth body member defines a plurality of channels in said first surface and a plurality of channels in said second surface, each of said first surface and said second surface channels being substantially U-shaped in longitudinal cross section.

16. The seat as recited in claim 15, wherein said body member includes means for assisting the proper positioning of said seat between said pipe and said support and for maintaining said seat between said pipe and said support once properly positioned.

* * * * *